United States Patent
Kusano et al.

(10) Patent No.: US 11,380,901 B2
(45) Date of Patent: Jul. 5, 2022

(54) RESIN CURRENT COLLECTOR, MULTILAYER CURRENT COLLECTOR AND LITHIUM ION BATTERY

(71) Applicant: Nissan Motor Co., Ltd., Yokohama (JP)

(72) Inventors: Ryosuke Kusano, Kyoto (JP); Yoshihiro Ikeda, Kyoto (JP); Yasuhiro Tsudo, Kyoto (JP); Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 289 days.

(21) Appl. No.: 16/756,059

(22) PCT Filed: Oct. 15, 2018

(86) PCT No.: PCT/JP2018/038326
§ 371 (c)(1),
(2) Date: Apr. 14, 2020

(87) PCT Pub. No.: WO2019/078160
PCT Pub. Date: Apr. 25, 2019

(65) Prior Publication Data
US 2020/0243867 A1    Jul. 30, 2020

(30) Foreign Application Priority Data
Oct. 17, 2017    (JP) .............................. JP2017-201101

(51) Int. Cl.
| *H01M 4/66* | (2006.01) |
| *H01M 10/0525* | (2010.01) |
| *H01M 10/052* | (2010.01) |

(52) U.S. Cl.
CPC ............ *H01M 4/668* (2013.01); *H01M 4/663* (2013.01); *H01M 4/667* (2013.01); *H01M 10/0525* (2013.01); *H01M 10/052* (2013.01); *Y02E 60/10* (2013.01)

(58) Field of Classification Search
CPC ............ H01M 10/052; H01M 10/0525; H01M 4/663; H01M 4/667; H01M 4/668; Y02E 60/10
See application file for complete search history.

(56) References Cited

U.S. PATENT DOCUMENTS

| 2011/0269017 A1* | 11/2011 | Sakamoto | ......... H01M 10/0585 |
| | | | 29/623.5 |
| 2012/0237824 A1 | 9/2012 | Koh et al. | |
| 2016/0149223 A1 | 5/2016 | Fukumoto et al. | |
| 2016/0284435 A1 | 9/2016 | Abe et al. | |

FOREIGN PATENT DOCUMENTS

| JP | S56-121202 A | 9/1981 |
| JP | S63-224103 A | 9/1988 |
| JP | 2004-164897 A | 6/2004 |
| JP | 2007-213930 A | 8/2007 |
| JP | 2011-54492 A | 3/2011 |
| JP | 2015-180714 A | 10/2015 |
| WO | 2015/005116 A1 | 1/2015 |

OTHER PUBLICATIONS

Extended European Search Report from corresponding application EP 18868942.6; dated Oct. 29, 2020; 7 pages.

* cited by examiner

Primary Examiner — Lingwen R Zeng
(74) Attorney, Agent, or Firm — Young Basile Hanlon & MacFarlane, P.C.

(57) ABSTRACT

A resin current collector provides means for improving the cycle characteristics in a lithium ion battery and includes a polyolefin resin, and a conductive carbon filler. The total surface area of the conductive carbon filler contained in 1 g of the resin current collector is 7.0 m$^2$ or more and 10.5 m$^2$ or less.

9 Claims, No Drawings

RESIN CURRENT COLLECTOR, MULTILAYER CURRENT COLLECTOR AND LITHIUM ION BATTERY

CROSS-REFERENCE TO RELATED APPLICATION(S)

The present application is a 371 national stage of International Application No. PCT/JP2018/038326, filed Oct. 15, 2018, which claims priority to Japanese Patent Application No. 2017-201101 filed on Oct. 17, 2017, the disclosures of which are incorporated herein by reference in their entirety.

TECHNICAL FIELD

The present invention relates to a resin current collector, a laminated current collector, and a lithium ion battery.

BACKGROUND

In recent years, there has been a strong demand for reducing carbon dioxide emissions in order to have environmental protection. The automotive industry expects that the introduction of electric vehicles (EV) or hybrid electric vehicles (HEV) will reduce carbon dioxide emissions. Thus, intensive efforts are being made to develop a motor driving secondary battery which holds the key to the practical application of those electric vehicles. As for the secondary battery, attention is being given to a lithium ion battery which can achieve high energy density and high output density.

A lithium ion battery typically includes electrodes (a positive electrode and a negative electrode) which are formed by applying active materials (a positive electrode active material and a negative electrode active material) or the like to current collectors (a positive electrode current collector and a negative electrode current collector) using binders. On the other hand, a bipolar battery includes a bipolar electrode including a current collector, a positive electrode active material layer which is formed by applying a positive electrode active material or the like to one face of the current collector using a binder, and a negative electrode active material layer which is formed by applying a negative electrode active material or the like to the other face of the current collector using a binder.

In such a conventional lithium ion battery, metal foil (metal current collector foil) is used as a current collector. In recent years, instead of the metal foil, there has been proposed a resin current collector which includes a resin to which a conductive filler is added. Such a resin current collector is lighter than metal current collector foil, and an improvement in an output per unit mass of the battery is expected.

WO 2015/005116 A discloses a dispersant for a resin current collector, a resin current collector material containing a resin and a conductive filler, and a resin current collector including the resin current collector material.

SUMMARY

WO 2015/005116 A describes, as an example of the resin current collector, an example in which a polypropylene resin is used as the resin, and acetylene black is used as the conductive filler. It turned out that, when such a resin current collector is used as a positive electrode current collector of a lithium ion battery, sufficient cycle characteristics cannot be maintained after a predetermined number of repetitions.

In view of the above circumstances, it is an object of the present invention to provide means for improving the cycle characteristics in a lithium ion battery.

The inventors of the present invention have conducted intensive studies to solve the problems described above. In the course of this process, it turned out that, when the resin current collector described in WO 2015/005116 A is used as a positive electrode current collector, a (oxidative) decomposition current flows, which becomes a cause of reducing the cycle characteristics. Then, the inventors have conducted further studies, and found out that the generation of the (oxidative) decomposition current can be reduced by reducing the total surface area of a conductive carbon filler contained in a resin current collector and completed the present invention. Specifically, a resin current collector according to an embodiment of the present invention includes a polyolefin resin, and a conductive carbon filler, and a total surface area of the conductive carbon filler contained in 1 g of the resin current collector is 7.0 $m^2$ or more and 10.5 $m^2$ or less. Further, a laminated current collector according to another embodiment of the present invention includes a conductive resin layer including a polyolefin resin and a conductive carbon filler, and a conductive film, the conductive resin layer and the conductive film being laminated, and a total surface area of the conductive carbon filler contained in 1 g of the conductive resin layer is 7.0 $m^2$ or more and 10.5 $m^2$ or less.

According to the present invention, a side reaction (decomposition reaction) becomes less likely to occur on the surface of the conductive carbon filler, and a decomposition current caused by the decomposition reaction is reduced by reducing the total surface area of the conductive carbon filler contained in 1 g of the resin current collector or the conductive resin layer to 7.0 $m^2$ or more and 10.5 $m^2$ or less. As a result, the cycle characteristics can be improved in the lithium ion battery.

DETAILED DESCRIPTION

Hereinbelow, an embodiment of the present invention will be described. Note that, in the present specification, "X to Y" indicating a range means "X or more and Y or less". Further, an operation and a measurement of physical properties and the like are performed under conditions of a room temperature (20 to 25° C.) and a relative humidity (40 to 50%) unless otherwise specifically noted. A resin current collector according to an embodiment of the present invention includes a polyolefin resin and a conductive carbon filler, and the total surface area of the conductive carbon filler contained in 1 g of the resin current collector is 7.0 $m^2$ or more and 10.5 $m^2$ or less.

Preferably, examples of the polyolefin resin include polyolefins [polyethylene (PE), polypropylene (PP), polymethylpentene (PMP), polycycloolefin (PCO), and the like]. More preferably, examples of the polyolefin resin include polyethylene (PE), polypropylene (PP), and polymethylpentene (PMP). For example, the followings are commercially available.

PE: "NOVATEC®, the same applies to the followings) LL UE320" and "NOVATEC LL UJ960", both manufactured by Japan Polyethylene Corporation PP: "SunAllomer®, the same applies to the followings) PM854X", "SunAllomer PC684S", "SunAllomer PL500A", "SunAllomer PC630S", "SunAllomer PC630A", and "SunAllomer PB522M", all manufactured by SunAllomer Ltd., "Prime Polymer® J-2000GP", manufactured by Prime Polymer Co., Ltd., and "WINTEC (product name) WFX4T", manufactured by Japan Polypropylene Corporation PMP: "TPX®", manufactured by Mitsui Chemicals, Inc.

In the resin current collector of the present invention, the total surface area of the conductive carbon filler contained in 1 g of the resin current collector is 7.0 m$^2$ or more and 10.5 m$^2$ or less, preferably 7.1 m$^2$ or more and 9.6 m$^2$ or less, more preferably 7.1 m$^2$ or more and 8 (8.0) m$^2$ or less, further more preferably 7.1 m$^2$ or more and 7.6 m$^2$ or less, and particularly preferably 7.3 m$^2$ or more and 7.6 m$^2$ or less. When the total surface area of the conductive carbon filler contained in 1 g of the resin current collector is less than 7.0 m$^2$, an electrical resistance value becomes too high. When the total surface area of the conductive carbon filler contained in 1 g of the resin current collector exceeds 10.5 m$^2$, a side reaction (decomposition reaction) occurs on the surface of the conductive carbon filler, and an excessive oxidative decomposition current flows, which deteriorates the cycle characteristics. The specific surface area of the conductive carbon filler is a value which is measured as a BET specific surface area in accordance with "JIS Z8830: 2013 Determination of the specific surface area of powders (solids) by gas adsorption-BET method".

The total surface area of the conductive carbon filler contained in 1 g of the resin current collector is calculated by the following equation.

the total surface area (m$^2$) of the conductive carbon filler contained in 1 g of the resin current collector=the mass (g) of the conductive carbon filler contained in 1 g of the resin current collector x the specific surface area (m$^2$/g) of the conductive carbon filler Note that, when the resin current collector includes, as the conductive carbon filler, two or more kinds of conductive carbon materials, the specific surface area of the conductive carbon filler is measured for each of the conductive carbon materials. In this case, the total surface area of the conductive carbon filler contained in 1 g of the resin current collector is calculated by multiplying the mass of each of the conductive carbon materials contained in 1 g of the resin current collector by the specific surface area of the corresponding conductive carbon material.

The side reaction (decomposition reaction) becomes less likely to occur on the surface of the conductive carbon filler by setting the total surface area of the conductive carbon filler contained in 1 g of the resin current collector to 10.5 m$^2$ or less. Accordingly, the decomposition current caused by the decomposition reaction is reduced, which improves the cycle characteristics.

Further, there is a positive correlation between the total surface area of the conductive carbon filler contained in 1 g of the resin current collector and an electrolyte solution impregnation amount in the resin current collector. When the electrolyte solution impregnation amount is large, the electrolyte solution oozes after charging and discharging the battery, which adversely affects the durability of the resin current collector. Thus, the durability of the resin current collector can be increased by reducing the total surface area of the conductive carbon filler contained in 1 g of the resin current collector to 10.5 m$^2$ or less.

For example, the total surface area of the conductive carbon filler contained in 1 g of the resin current collector described in examples 14 to 19, 21 to 24, 26, and 27 of Patent Literature 1 is 6.9 m$^2$. Thus, an electrical resistance value becomes too high, and a sufficient battery performance cannot be obtained. In the other examples, the total surface area is 13.8 to 80.0 m$^2$. Thus, an oxidative decomposition current is generated, and sufficient cycle characteristics cannot be maintained. Further, the durability of the resin current collector is insufficient.

Examples of the conductive carbon filler include, but not limited to, graphite, carbon blacks (acetylene black, Ketjen black (registered trademark, the same applies to the followings), furnace black, channel black, thermal lamp black, and the like), mixtures thereof, and the like.

The resin current collector of the present invention can employ a method using a conductive carbon filler having a small specific surface area in order to reduce the total surface area of the conductive carbon filler contained in 1 g of the resin current collector to 10.5 m$^2$ or less. On the other hand, when the conductive carbon filler having a small specific surface area is used, the electrical resistance of the resin current collector becomes relatively high. Thus, in order to obtain a required electrical resistance value, it is necessary to increase the blending amount of the conductive carbon filler. When the blending amount of the conductive carbon filler is increased, it may become difficult to thin the resin current collector. When the resin current collector cannot be thinned, the battery capacity is reduced due to a large volume of the current collector inside the battery. Thus, increasing the blending amount of the conductive carbon filler is not preferred.

Thus, as a preferred mode of the resin current collector of the present invention, a mode which uses, as the conductive carbon filler, a conductive carbon material having a small specific surface area and a conductive carbon material having a large specific surface area and high conductivity in combination can be considered. Accordingly, it is possible to response to both a request to improve the cycle characteristics and a request to achieve thinning.

Specifically, the resin current collector according to a preferred embodiment of the present invention includes a first conductive carbon filler (A1) having a specific surface area of 10.0 m$^2$/g or less (hereinbelow, also merely referred to as "(A1)") and a second conductive carbon filler (A2) having a specific surface area of 30.0 m$^2$/g or more and 70.0 m$^2$/g or less (hereinbelow, also merely referred to as "(A2)").

A low electrical resistance value can be obtained by including the second conductive carbon filler (A2) having a large specific surface area and high conductivity. Thus, including the second conductive carbon filler (A2) is suitable for thinning the resin current collector. On the other hand, the second conductive carbon filler (A2) having a large specific surface area also becomes a reaction field for a side reaction. Thus, it is possible to reduce the area of the reaction field for a side reaction to reduce the decomposition current by a combined use with the first conductive carbon filler (A1) having a small specific surface area. That is, it is possible to provide the resin current collector which is excellent in cycle characteristics and suitable for thinning by combining properties of a plurality of conductive carbon materials having different specific surface areas.

When (A1) and (A2) are included as the conductive carbon filler, the total surface area (m$^2$) of the conductive carbon filler contained in 1 g of the resin current collector is calculated by the following equation.

the total surface area (m$^2$) of the conductive carbon filler contained in 1 g of the resin current collector=the mass (g) of (A1) contained in 1 g of the resin current collectorxthe specific surface area (m$^2$/g) of (A1)+the mass (g) of (A2) contained in 1 g of the resin current collectorxthe specific surface area (m$^2$/g) of (A2)

An upper limit of the specific surface area of the first conductive carbon filler (A1) is 10.0 m$^2$/g or less, more preferably 2.0 m$^2$/g or less, and particularly preferably 1.8 m$^2$/g or less. Further, a lower limit of the specific surface area of the first conductive carbon filler (A1) is preferably 0.1 m$^2$/g or more.

Examples of the first conductive carbon filler (A1) include, but not limited to, natural or artificial graphite, hard carbon (non-graphitizable carbon), mixtures thereof, and the like. Among these materials, graphite is preferred. Further, although the shape of the first conductive carbon filler (A1) may be any of a spherical shape, a flake shape, and a vein shape, the shape of first conductive carbon filler (A1) is preferably a spherical shape.

The mean volume particle diameter of the first conductive carbon filler (A1) is preferably 5.0 μm or more, and more preferably 5.0 μm or more and 11.5 μm or less. In the present specification, the mean volume particle diameter of the conductive carbon filler means a particle size (Dv50) at an integrated value of 50% in a particle size distribution which is obtained by a micro-track method (laser diffraction/scattering method). The micro-track method is a method for obtaining a particle size distribution using scattered light which is obtained by applying laser light to particles. Note that a microtrac manufactured by MicrotracBEL Corp. or the like can be used in the measurement of the mean volume particle diameter.

The first conductive carbon filler (A1) may contain two or more kinds of conductive carbon materials. In this case, the conductive carbon materials may be of different kinds and have different specific surface areas or different mean volume particle diameters as long as the specific surface area of each of the conductive carbon materials is 10.0 m$^2$/g or less.

The specific surface area of the second conductive carbon filler (A2) is 30.0 m$^2$/g or more and 70.0 m$^2$/g or less, preferably 39 m$^2$/g or more and 69 m$^2$/g or less, more preferably 50 m$^2$/g or more and 69 m$^2$/g or less, further more preferably 60 m$^2$/g or more and 69 m$^2$/g or less, and particularly preferably 65 m$^2$/g or more and 69 m$^2$/g or less.

Examples of the second conductive carbon filler (A2) include, but not limited to, carbon blacks (acetylene black, Ketjen black, furnace black, channel black, thermal lamp black, and the like) and the like. Among these materials, acetylene black is preferred.

Further, the mean volume particle diameter of the second conductive carbon filler (A2) is preferably 3 nm or more and 500 nm or less. The mean volume particle diameter can be measured by the micro-track method (laser diffraction/scattering method) as described above.

The second conductive carbon filler (A2) may contain two or more kinds of conductive carbon materials. In this case, the conductive carbon materials may be of different kinds and have different specific surface areas or different mean volume particle diameters as long as the specific surface area of each of the conductive carbon materials is 30.0 m$^2$/g or more and 70.0 m$^2$/g or less.

In the resin current collector of the present invention, the mass proportion of the first conductive carbon filler (A1) in the resin current collector is preferably 30 mass % or more and 60 mass % or less. Further, the mass proportion of the second conductive carbon filler (A2) in the resin current collector is preferably 3 mass % or more and 10 mass % or less.

In the resin current collector of the present invention, the mass ratio of the first conductive carbon filler (A1) to the second conductive carbon filler (A2) [the mass of the first conductive carbon filler (A1)/the mass of the second conductive carbon filler (A2)] is preferably 3 or more and 20 or less, more preferably 3 to 7, further more preferably 3 to 6.1, particularly preferably 3 to 5, and most preferably 3 to 4. When the above mass ratio is 3 or more, the proportion of the second conductive carbon filler (A2) having a large specific surface area is relatively small. Thus, there is a small influence of the side reaction on the surface of the second conductive carbon filler (A2), and the cycle characteristics becomes better. Further, when the above mass ratio is 20 or less, the proportion of the first conductive carbon filler (A1) having a relatively low conductivity is not too large. Thus, it is possible to reduce the amount of a filler necessary to reduce the electrical resistance value of the resin current collector, which facilitates thinning of the resin current collector.

In the resin current collector of the present invention, the proportion of the total mass of the first conductive carbon filler (A1) and the second conductive carbon filler (A2) in the mass of the resin current collector is preferably 40 mass % or more and less than 70 mass %, more preferably 40 mass % or more and 64 mass % or less, further more preferably 40 mass % or more and 60 mass % or less, particularly preferably 40 mass % or more and 55 mass % or less, and most preferably 40 mass % or more and 50 mass % or less. When the above proportion is 40 mass % or more, the amount of the conductive carbon filler contained in the resin current collector is sufficient. Thus, the electrical resistance value can be further reduced. Further, when the above proportion is less than 70 mass %, the proportion of the polyolefin resin contained in the resin current collector does not become too low. Thus, there is a small influence on the formability of the resin current collector, and such a proportion is more suitable for thinning of the resin current collector.

The resin current collector may contain a conductive material other than the conductive carbon filler. Examples of the conductive material include metals [nickel, aluminum, silver, copper, titanium, and the like], alloys thereof (stainless (SUS) and the like), and mixtures thereof. In terms of electrical stability, the conductive material preferably contains nickel, and is more preferably nickel. Further, a particulate ceramic material or resin material coated with any of the metals described above by plating or the like may be used as the conductive material.

In addition to the polyolefin resin and the conductive carbon filler, the resin current collector may further appropriately contain other components [dispersants (modified polyolefin, a surfactant, and the like), a colorant, an ultraviolet absorber, general-purpose plasticizers (a phthalate skeleton-containing compound, a trimellitic acid skeleton-containing compound, a phosphate group-containing compound, an epoxy skeleton-containing compound, and the like], and the like as needed. In terms of electric stability, the total addition amount of the other components is preferably 0.001 parts by mass or more and 5 parts by mass or less in 100 parts by mass of the resin current collector, and more preferably 0.001 parts by mass or more and 3 parts by mass or less.

Further, the proportion of the polyolefin resin contained in the resin current collector is preferably 30 mass % or more and 60 mass % or less. When the proportion of the polyolefin resin falls within this range, the formability is excellent. Thus, such a proportion is suitable for thinning of the resin current collector.

In the resin current collector of the present invention, the thickness of the resin current collector is preferably 100 μm or less, and more preferably 50 μm or more and 80 μm or less. When the thickness of the resin current collector is 100 µm or less, it can be said that the thickness as the resin current collector is thin, and the thinned resin current collector is achieved. Such a resin current collector has a small volume inside the battery, and is thus suitable for high energy density of the battery. Further, when the thickness of the resin current collector is 50 µm or more, a sufficient strength of the resin current collector is obtained. Thus, such a thickness is preferred.

Further, in the resin current collector of the present invention, an electrical resistance value (penetration resistance value) of the resin current collector in the thickness direction is preferably 1 $\Omega \cdot cm^2$ or more and 150 $\Omega \cdot cm^2$ or less. The electrical resistance value in the thickness direction can be measured by the following method.

<Measurement of Electrical Resistance Value in Thickness Direction>

A resin current collector cut into a strip shape of 3 cm×10 cm is used as a measurement test piece. The test piece is put between electrodes of an electrical resistance measuring device [IMC-0240 type, manufactured by Imoto Machinery Co., Ltd.] to which a resistance meter [RM3548, manufactured by HIOKI] is connected, and a resistance value is measured while applying a load of 2.16 kg to the electrodes. A value which is obtained by multiplying a value measured 60 seconds after starting the application of the load by the contact area (3.14 $cm^2$) between the electrodes and the test piece can be defined as the electrical resistance value in the thickness direction. Note that the electrical resistance measuring device [IMC-0240 type, manufactured by Imoto Machinery Co., Ltd.] is a device for measuring a resistance value of a test piece put between positive and negative electrodes, the device being in conformity with a device used in a measurement of an electrical volume resistance in the thickness direction in JIS K6378-5: 2016.

Preferably, the resin current collector of the present invention can be manufactured by the following method. First, a resin current collector material is obtained by mixing the polyolefin resin, the conductive carbon filler, and other components as needed. The first conductive carbon filler (A1) and the second conductive carbon filler (A2) are preferably used in combination as the conductive carbon filler. As for a mixing method, known mixing methods in a method for manufacturing a masterbatch, a method for manufacturing a thermoplastic resin composition (a composition including a dispersant, a filler, and a thermoplastic resin or a composition including a masterbatch and a thermoplastic resin), and the like are used. The mixing can be performed by heating, melting, and mixing components in a pellet or powder form using an appropriate mixer, such as a kneader, an internal mixer, a Bunbury mixer, or a roll.

The components can be added in any order without particular limitations during mixing. The obtained mixture may be further formed into pellets using a pelletizer or the like, or powder.

The resin current collector of the present invention can be obtained by forming the obtained resin current collector material into, for example, a film-like shape. Examples of a method for forming the material into the film-like shape include known film forming methods, such as a T-die method, an inflation method, and a calendering method. Note that the resin current collector of the present invention can also be obtained by a forming method other than the film forming method.

The resin current collector of the present invention is preferably used as a current collector of a lithium ion battery. Although the resin current collector of the present invention can be used as a positive electrode resin current collector and also a negative electrode resin current collector, the resin current collector of the present invention is preferably used as a positive electrode resin current collector of a lithium ion battery.

The resin current collector of the present invention can also be used as a bipolar electrode resin current collector. In a bipolar electrode in which a positive electrode active material layer is formed on one face of a current collector, and a negative electrode active material layer is formed on the other face thereof, the current collector is preferably the resin current collector of the present invention.

Next, a laminated current collector of the present invention will be described. A laminated current collector according to an embodiment of the present invention includes a conductive resin layer including a polyolefin resin and a conductive carbon filler, and a conductive film, the conductive resin layer and the conductive film being laminated. Further, the total surface area of the conductive carbon filler contained in 1 g of the conductive resin layer is 7.0 $m^2$ or more and 10.5 $m^2$ or less. In the present embodiment, the conductive resin layer is preferably disposed on at least one face of the laminated current collector, and the conductive resin layer is preferably disposed on both faces of the laminated current collector. An effect of reducing the generation of a (oxidative) decomposition current is facilitated by the conductive resin layer disposed on the surface of the laminated current collector.

Further, a laminated current collector according to another embodiment of the present invention includes two or more laminated conductive resin layers each of which includes a polyolefin resin and a conductive carbon filler. Further, the total surface area of the conductive carbon filler contained in 1 g of the conductive resin layer is 7.0 $m^2$ or more and 10.5 $m^2$ or less.

The conductive resin layer of the laminated current collector includes the polyolefin resin and the conductive carbon filler. Concrete examples of the polyolefin resin and the conductive carbon filler are similar to those of the polyolefin resin and the conductive carbon filler of the resin current collector of the present invention described above. Thus, detailed description thereof will be omitted. Further, as for a preferred mode of the conductive resin layer, the embodiment of the resin current collector described above can be employed as it is. Thus, detailed description thereof will be omitted. The cycle characteristics can be improved in the lithium ion secondary battery in a manner similar to the resin current collector described above by including at least one conductive resin layer in which the total surface area of the conductive carbon filler contained in 1 g of the conductive resin layer is 7.0 $m^2$ or more and 10.5 $m^2$ or less. Further, the conductive resin layer preferably includes a first conductive carbon filler (A1) having a specific surface area of 10.0 $m^2$/g or less and a second conductive carbon filler (A2) having a specific surface area of 30.0 $m^2$/g or more and 70.0 $m^2$/g or less.

In the present specification, the conductive film means a layer other than the conductive resin layer, the layer including a material having conductivity. The conductive film may include a polyolefin resin and a conductive carbon filler as with the conductive resin layer described above. However, in this case, the total surface area of the conductive carbon filler contained in 1 g of the conductive film is less than 7.0 $m^2$ or more than 10.5 $m^2$. Further, the conductive film may include a resin other than the polyolefin resin and/or a filler other than the conductive carbon filler (e.g., a metal filler).

When only a conductive carbon filler having a small specific surface area and a large mean volume particle diameter (e.g., graphite) is used as the conductive carbon filler included in the conductive resin layer, the formability of the conductive resin layer may not be so good. On the other hand, a conductive resin layer including only a conductive carbon filler having a large specific surface area and a small mean volume particle diameter (e.g., acetylene black) often has excellent formability. Thus, a laminate using such a conductive resin layer having excellent formability in combination can achieve the laminated current collector with its entire shape maintained.

A lithium ion battery of the present invention includes the resin current collector of the present invention or the laminated current collector of the present invention described above. For example, when the lithium ion battery of the present invention includes the resin current collector of the present invention or the laminated current collector of the present invention as a positive electrode resin current collector, the lithium ion battery includes the resin current collector of the present invention or the laminated current collector of the present invention, and a positive electrode active material layer which is formed on the surface of the resin current collector of the present invention or the laminated current collector of the present invention. The positive electrode active material layer includes a positive electrode active material, and additives such as a binder, a conductive aid, and the like as needed.

On the other hand, when the lithium ion battery of the present invention includes the resin current collector of the present invention as a negative electrode resin current collector, the lithium ion battery of the present invention includes the resin current collector of the present invention or the laminated current collector of the present invention, and a negative electrode active material layer which is formed on the surface of the resin current collector of the present invention or the laminated current collector of the present invention. The negative electrode active material layer or the laminated current collector of the present invention includes a negative electrode active material, and additives such as a binder, a conductive aid, and the like as needed.

The lithium ion battery of the present invention further includes an electrolyte solution and a separator. In the lithium ion battery of the present invention, known materials can be used as materials of the positive electrode active material, the negative electrode active material, the electrolyte solution, the separator, and the like. The positive electrode active material and the negative electrode active material may be coated active materials coated with a resin such as an acrylic resin. When the positive electrode current collector or the negative electrode current collector is not the resin current collector of the present invention or the laminated current collector of the present invention, the current collector may be metal current collector foil or a resin current collector other than the current collector of the present invention.

EXAMPLES

Next, the present invention will be specifically described using examples. However, the present invention is not limited to the following examples unless departing from the gist of the present invention. Note that "part" means "part by mass", and "%" means "mass %" unless otherwise specifically noted.

Materials used in the following examples are as follows.
Conductive Carbon Filler A1-1: graphite particle [specific surface area: 0.6 $m^2/g$, product name: "SNG-P1A1", manufactured by JFE Chemical Corporation]

A1-2: graphite particle [specific surface area: 6.95 $m^2/g$, product name: "CPB", manufactured by Nippon Graphite Industries, Co., Ltd.]

A1-3: graphite particle [specific surface area: 1.8 $m^2/g$, product name: "SNG-WXA1", manufactured by JFE Chemical Corporation]

A'1-1: graphite particle [specific surface area: 11.3 $m^2/g$, product name: "SG-BH8", manufactured by Ito Graphite Co., Ltd.]

A2-1: acetylene black [specific surface area: 69 $m^2/g$, product name: "DENKA BLACK", manufactured by Denka Company Limited]

A2-2: acetylene black [specific surface area: 39 $m^2/g$, product name: "DENKA BLACK Li-400", manufactured by Denka Company Limited]

A2-3: acetylene black [specific surface area: 68 $m^2/g$, product name: "ENSACO 250G (granules)", manufactured by Imerys]

A'2-1: acetylene black [specific surface area: 800 $m^2/g$, product name: "EC300J", manufactured by Lion Corporation]

Resin (Polypropylene Resin)

PP1: polypropylene resin [product name: "SunAllomer PM854X", manufactured by SunAllomer Ltd.]

PP2: polypropylene resin [product name: "SunAllomer PC684S", manufactured by SunAllomer Ltd.]

Dispersant: [product name: "UMEX 1001 (acid-modified polypropylene)", manufactured by Sanyo Chemical Industries, Ltd.]

Example 1

By using a biaxial extruder, 84 parts by mass of a polypropylene resin (PP2), 11 parts by mass of a conductive carbon filler (A2-3), and 5 parts by mass of a dispersant were melt-kneaded under conditions of 180° C., 100 rpm, and a retention time of 5 minutes to obtain a resin current collector material. The obtained resin current collector material was extruded from a T-die, and rolled by a hot press machine to obtain a resin current collector.

Examples 2 to 7, Comparative Examples 1 to 6

The kind and the blending amount of the conductive carbon filler, the resin, and the dispersant were changed as shown in Table 1, and a resin current collector material and a resin current collector were obtained by a method similar to that of Example 1.

Example 8

The resin current collectors of Example 2 were laminated on the upper and lower sides of the resin current collector of Comparative Example 2, and hot-pressed at 180° C. to produce a laminated current collector as a laminate. In the laminated current collector, the resin current collector of Comparative Example 2 corresponds to the conductive film, and the resin current collector of Example 2 corresponds to the conductive resin layer which includes a polyolefin resin and a conductive carbon filler and in which the total surface area of the conductive carbon filler contained in 1 g of the conductive resin layer is 7.0 $m^2$ or more and 10.5 $m^2$ or less.

The configuration of the laminated current collector of Example 8 is shown in Table 2.

Measurement of Resin Current Collector Thickness

The thickness of the resin current collector was measured using a contact type thickness gauge [ABS Digimatic Indicator ID-CX manufactured by Mitsutoyo Corporation]. The thickness is the mean value at 10 positions inside a face ($\phi$10 cm) of the resin current collector. A case where the thickness of the resin current collector is 100 µm or less is determined to be excellent, and indicated with "○" on a field of the film formability in each table. A case where the thickness of the resin current collector is more than 100 µm and less than 150 µm is indicated with "Δ". A case where the thickness of the resin current collector is 150 µm or more is indicated with "×".

<Measurement of Penetration Resistance Value>

The resin current collector was cut into a strip shape of approximately 3 cm×10 cm, and a penetration resistance value of each resin current collector was measured using the electrical resistance measuring device [IMC-0240 type, manufactured by Imoto Machinery Co., Ltd.] and the resistance meter [RM3548, manufactured by HIOKI]. The resistance value of each resin current collector with a load of 2.16 kg applied to the electrical resistance measuring device was measured, and a value measured 60 seconds after starting the application of the load of 2.16 kg was defined as the resistance value of the resin current collector. As shown in the following equation, the penetration resistance value ($\Omega \cdot cm^2$) is calculated by multiplying the obtained resistance value by the area (3.14 cm$^2$) of a contact surface of a jig during resistance measurement.

penetration resistance value ($\Omega \cdot cm^2$)=resistance value ($\Omega$)×3.14 cm$^2$ A case where the penetration resistance value is 50 $\Omega \cdot cm^2$ or less is determined to be excellent, and indicated with "○" on a field of the resistance determination in each table. A case where the penetration resistance value is more than 50 $\Omega \cdot cm^2$ is indicated with "×".

<Measurement of Oxidation Current Amount>
<Production of Coin Cell for Potential Resistance Test>

A gasket, Li foil cut into $\phi$16 mm, and a separator (having a thickness of 25 µm and made of polypropylene) cut into $\phi$17 mm were stacked in this order on a negative electrode can of a 2032 type coin cell, and 100 µL of an electrolyte solution was added thereto. On the top of that, the resin current collector cut into $\phi$15 mm was put, and carbon-coated aluminum [SDX, manufactured by SHOWA DENKO K.K.], two spacers (each having a thickness of 500 µm), a disc spring, and a positive electrode can were further stacked in this order and sealed to produce a coil cell for evaluation. Note that a solution obtained by dissolving 1M LiPF6 (LiPF6 at a ratio of 1 mol/L) in a mixture solvent of ethylene carbonate and dimethyl carbonate (at a volume ratio of 1:1) was prepared as the electrolyte solution.

<Potential Resistance Test Evaluation of Resin Current Collector>

By using a charge/discharge measuring device [HJ1001SM8A, manufactured by HOKUTO DENKO CORPORATION], the coin cell for evaluation was charged to a voltage of 4.2 V, and a current generated with the voltage continuously applied was measured for 200 hours. A result of the test is the total amount of current flowing with the voltage of 4.2 V continuously applied. A small amount of oxidation current shows that a capacity loss resulting from a member when used as a constituent member of the battery can be reduced, and an excellent reliability can be maintained for a long period of time. A case where the oxidation current amount is 0.5 mAh/$\phi$15 or less is determined to be excellent, and indicated with "○" on a field of the oxidation current amount determination in each table. A case where the oxidation current amount is more than 0.5 mAh/$\phi$15 is indicated with "×". Note that the penetration resistance value and the oxidation current amount in Example 8 can be measured by using the laminated current collector manufactured in Example 8 instead of the resin current collector.

TABLE 1

RESIN CURRENT COLLECTOR COMPOSITION

| | CONDUCTIVE CARBON FILLER | | | | | | | | RESIN | | DISPERSANT | | TOTAL PROPORTION OF A1 AND A2 IN RESIN CURRENT COLLECTOR (MASS %) | TOTAL SURFACE AREA OF FILLER CONTAINED IN 1 g OF RESIN CURRENT COLLECTOR (m$^2$) |
|---|---|---|---|---|---|---|---|---|---|---|---|---|---|---|
| | A1 (GRAPHITE PARTICLE) | | | | A2 (AB) | | | | PP1 | PP2 | | MASS RATIO OF A1/A2 | | |
| SPECIFIC SURFACE AREA (m$^2$/g) | A1-1 0.6 | A1-2 6.95 | A1-3 1.8 | A'1-1 11.3 | A2-1 69 | A2-2 39 | A2-3 68 | A'2-1 800 | BLENDING AMOUNT (PART BY MASS) | BLENDING AMOUNT (PART BY MASS) | | | | |
| | BLENDING AMOUNT (PART BY MASS) | | | | BLENDING AMOUNT (PART BY MASS) | | | | | | | | | |
| EXAMPLE 1 | 0 | 0 | 0 | 0 | 0 | 0 | 11 | 0 | 0 | 84 | 5 | — | 11 | 7.5 |
| EXAMPLE 2 | 40 | 0 | 0 | 0 | 10 | 0 | 0 | 0 | 0 | 45 | 5 | 4.0 | 50 | 7.1 |
| EXAMPLE 3 | 0 | 0 | 40 | 0 | 10 | 0 | 0 | 0 | 0 | 45 | 5 | 4.0 | 50 | 7.6 |
| EXAMPLE 4 | 16 | 0 | 0 | 0 | 0 | 0 | 14 | 0 | 65 | 0 | 5 | 1.1 | 30 | 9.6 |
| EXAMPLE 5 | 0 | 0 | 40 | 0 | 0 | 0 | 10 | 0 | 45 | 0 | 5 | 4.0 | 50 | 7.5 |
| EXAMPLE 6 | 0 | 0 | 30 | 0 | 0 | 0 | 10 | 0 | 55 | 0 | 5 | 3.0 | 40 | 7.3 |
| EXAMPLE 7 | 0 | 0 | 55 | 0 | 0 | 0 | 9 | 0 | 31 | 0 | 5 | 6.1 | 64 | 7.1 |
| COMPARATIVE EXAMPLE 1 | 0 | 0 | 0 | 0 | 25 | 0 | 0 | 0 | 0 | 70 | 5 | — | 25 | 17.3 |
| COMPARATIVE EXAMPLE 2 | 0 | 0 | 0 | 0 | 25 | 0 | 0 | 0 | 70 | 0 | 5 | — | 25 | 17.3 |
| COMPARATIVE EXAMPLE 3 | 0 | 0 | 0 | 0 | 0 | 30 | 0 | 0 | 65 | 0 | 5 | — | 30 | 11.7 |

TABLE 1-continued

| | | | | | | | | | | | | | | |
|---|---|---|---|---|---|---|---|---|---|---|---|---|---|---|
| COMPARATIVE EXAMPLE 4 | 0 | 20 | 0 | 20 | 10 | 0 | 0 | 0 | 45 | 0 | 5 | 4.0 | 50 | 10.8 |
| COMPARATIVE EXAMPLE 5 | 40 | 0 | 0 | 0 | 0 | 0 | 0 | 2 | 53 | 0 | 5 | 20.0 | 42 | 16.2 |
| COMPARATIVE EXAMPLE 6 | 0 | 0 | 0 | 0 | 10 | 0 | 0 | 0 | 85 | 0 | 5 | — | 10 | 8.9 |

| | EVALUATION | | | | | |
|---|---|---|---|---|---|---|
| SPECIFIC SURFACE AREA ($m^2/g$) | RESIN CURRENT COLLECTOR THICKNESS (μM) | FILM FORMALITY | PENETRATION RESISTANCE VALUE ($\Omega \cdot cm^2$) | RESISTANCE DETERMINATION | OXIDATION CURRENT AMOUNT (mAh/φ15) | OXIDATION CURRENT AMOUNT DETERMINATION |
| EXAMPLE 1 | 70 | ○ | 28.8 | ○ | 0.25 | ○ |
| EXAMPLE 2 | 100 | ○ | 31.8 | ○ | 0.26 | ○ |
| EXAMPLE 3 | 105 | Δ | 15.5 | ○ | 0.39 | ○ |
| EXAMPLE 4 | 85 | ○ | 20.5 | ○ | 0.49 | ○ |
| EXAMPLE 5 | 100 | ○ | 3.6 | ○ | 0.50 | ○ |
| EXAMPLE 6 | 100 | ○ | 5.1 | ○ | 0.47 | ○ |
| EXAMPLE 7 | 130 | Δ | 1.8 | ○ | 0.45 | ○ |
| COMPARATIVE EXAMPLE 1 | 90 | ○ | 4.00 | ○ | 1.45 | x |
| COMPARATIVE EXAMPLE 2 | 90 | ○ | 2.75 | ○ | 0.54 | x |
| COMPARATIVE EXAMPLE 3 | 85 | ○ | 1.48 | ○ | 0.98 | x |
| COMPARATIVE EXAMPLE 4 | 105 | Δ | 5.4 | ○ | 1.41 | x |
| COMPARATIVE EXAMPLE 5 | 100 | ○ | 15.7 | ○ | 0.75 | x |
| COMPARATIVE EXAMPLE 6 | 100 | ○ | 63.0 | x | 0.23 | ○ |

TABLE 2

| RESIN CURRENT COLLECTOR COMPOSITION | | | | | | | | | | | | |
|---|---|---|---|---|---|---|---|---|---|---|---|---|
| CONDUCTIVE CARBON FILLER | | | | | | | | RESIN | | | | TOTAL PROPORTION OF A1 |
| A1 (GRAPHITE PARTICLE) | | | | A2 (AB) | | | | PP1 | PP2 | DISPERSANT | | |
| A1-1 | A1-2 | A1-3 | A'1-1 | A2-1 | A2-2 | A2-3 | A'2-1 | BLENDING | BLENDING | | | AND A2 IN |
| SPECIFIC SURFACE AREA ($m^2/g$) 0.6 | 6.95 | 1.8 | 11.3 | 69 | 39 | 68 | 800 | AMOUNT (PART BY MASS) | AMOUNT (PART BY MASS) | MASS RATIO OF A1/A2 | | RESIN CURRENT COLLECTOR (MASS %) |
| BLENDING AMOUNT (PART BY MASS) | | | | BLENDING AMOUNT (PART BY MASS) | | | | | | | | |
| EXAMPLE 8  40 | 0 | 0 | 0 | 10 | 0 | 0 | 0 | 0 | 45 | 5 | 4.0 | 50 |
| 0 | 0 | 0 | 0 | 25 | 0 | 0 | 0 | 70 | 0 | 5 | — | 25 |
| 40 | 0 | 0 | 0 | 10 | 0 | 0 | 0 | 0 | 45 | 5 | 4.0 | 50 |

| | | EVALUATION | | | | |
|---|---|---|---|---|---|---|
| SPECIFIC SURFACE AREA ($m^2/g$) | TOTAL SURFACE AREA OF FILLER CONTAINED IN 1 g OF RESIN CURRENT COLLECTOR ($m^2$) | RESIN CURRENT COLLECTOR THICKNESS (μM) | FILM FORMALITY | PENETRATION RESISTANCE VALUE ($\Omega \cdot cm^2$) | RESISTANCE DETERMINATION | OXIDATION CURRENT AMOUNT (mAh/φ15) | OXIDATION CURRENT AMOUNT DETERMINATION |
| EXAMPLE 8 | 7.1 17.3 7.1 | 100 | ○ | 43.1 | ○ | 0.36 | ○ |

In Examples 1 to 7, the total surface area of the conductive carbon filler contained in 1 g of the resin current collector falls within a preferred range. Thus, the penetration resistance value and the oxidation current amount fall within excellent ranges. Further, the thickness of the resin current collector necessary to maintain the film shape does not become too thick, and the resin current collector can also be thinned. Example 8 of the laminated current collector also includes the conductive resin layer in which the total surface area of the conductive carbon filler contained in 1 g of the conductive resin layer falls within a preferred range. Thus, an excellent result was obtained.

In Comparative Examples 1 to 6, the total surface area of the conductive carbon filler contained in 1 g of the resin current collector is too large or too small. Thus, the evaluation result of either the penetration resistance value or the oxidation current amount was bad.

The resin current collector of the present invention is particularly useful as a current collector for lithium ion batteries used in cellular phones, personal computers, hybrid vehicles, and electric vehicles.

The invention claimed is:

1. A resin current collector comprising: a polyolefin resin; and a conductive carbon filler, wherein
   a total surface area of the conductive carbon filler contained in 1 g of the resin current collector is 7.0 m$^2$ or more and 10.5 m$^2$ or less.

2. The resin current collector according to claim 1, wherein the conductive carbon filler includes a first conductive carbon filler (A1) having a specific surface area of 10.0 m$^2$/g or less and a second conductive carbon filler (A2) having a specific surface area of 30.0 m$^2$/g or more and 70.0 m$^2$/g or less.

3. The resin current collector according to claim 2, wherein a mass ratio of the first conductive carbon filler (A1) to the second conductive carbon filler (A2) [a mass of the first conductive carbon filler (A1)/a mass of the second conductive carbon filler (A2)] is 3 or more and 20 or less.

4. The resin current collector according to claim 2, wherein a proportion of a total mass of the first conductive carbon filler (A1) and the second conductive carbon filler (A2) in a mass of the resin current collector is 40 mass % or more and less than 70 mass %.

5. The resin current collector according to claim 1, wherein the resin current collector is a positive electrode resin current collector of a lithium ion battery.

6. The resin current collector according to claim 1, wherein the resin current collector is a bipolar electrode resin current collector of a lithium ion battery.

7. A laminated current collector comprising:
   a conductive resin layer including a polyolefin resin and a conductive carbon filler; and
   a conductive film, the conductive resin layer and the conductive film being laminated, wherein
   a total surface area of the conductive carbon filler contained in 1 g of the conductive resin layer is 7.0 m$^2$ to 10.5 m$^2$.

8. A lithium ion battery comprising the resin current collector according to claim 1.

9. A lithium ion battery comprising the laminated current collector according to claim 7.

* * * * *